(12) United States Patent
Takakura et al.

(10) Patent No.: US 9,616,735 B2
(45) Date of Patent: Apr. 11, 2017

(54) VEHICLE ROLL SHADE DEVICE

(71) Applicant: YACHIYO INDUSTRY CO., LTD., Sayama-shi, Saitama (JP)

(72) Inventors: Sou Takakura, Sayama (JP); Hirotaka Kamioka, Sayama (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 15/125,304

(22) PCT Filed: Feb. 20, 2015

(86) PCT No.: PCT/JP2015/054721
§ 371 (c)(1),
(2) Date: Sep. 12, 2016

(87) PCT Pub. No.: WO2015/137083
PCT Pub. Date: Sep. 17, 2015

(65) Prior Publication Data
US 2017/0066309 A1    Mar. 9, 2017

(30) Foreign Application Priority Data

Mar. 13, 2014 (JP) ................................ 2014-050560

(51) Int. Cl.
*B60J 7/00* (2006.01)
*B60J 7/185* (2006.01)

(52) U.S. Cl.
CPC ............. *B60J 7/0015* (2013.01); *B60J 7/185* (2013.01)

(58) Field of Classification Search
CPC ................................ B60J 7/0015; B60J 7/185
See application file for complete search history.

(56) References Cited

U.S. PATENT DOCUMENTS 3,543,425 A * 12/1970 Schuessler ............. G09F 11/26
                                                          40/117
7,082,983 B2    8/2006 Coulibaly et al.
2006/0216372 A1* 9/2006 Crepel ................. A23C 9/1307
                                                          426/34

FOREIGN PATENT DOCUMENTS

| JP | 2000-282767 A | 10/2000 |
| JP | 2001-180280 A | 7/2001 |
| JP | 2003-211957 A | 7/2003 |
| JP | 2013-230752 A | 11/2013 |

* cited by examiner

*Primary Examiner* — Lori L Lyjak
(74) *Attorney, Agent, or Firm* — Carrier Blackman & Associates, P.C.; Joseph P. Carrier; William D. Blackman

(57) ABSTRACT

A vehicle roll shade device is provided which includes a shade that opens and closes an inner opening of a roof; a roll shaft that winds the shade in a roll shape; a bearing member that pivotally supports the roll shaft; and an elastic member that is interposed between the roll shaft and the bearing member, wherein the bearing member includes: a lock mechanism that locks rotation of the roll shaft in a state of being urged to rotate in a shade rewinding direction by the elastic member; and a release mechanism that releases a locked state of the lock mechanism, and wherein a portion of the release mechanism comes in contact with a predetermined portion to be displaced when the bearing member is assembled to an assembling position, and the locked state of the lock mechanism is released in conjunction with the displacement.

3 Claims, 5 Drawing Sheets

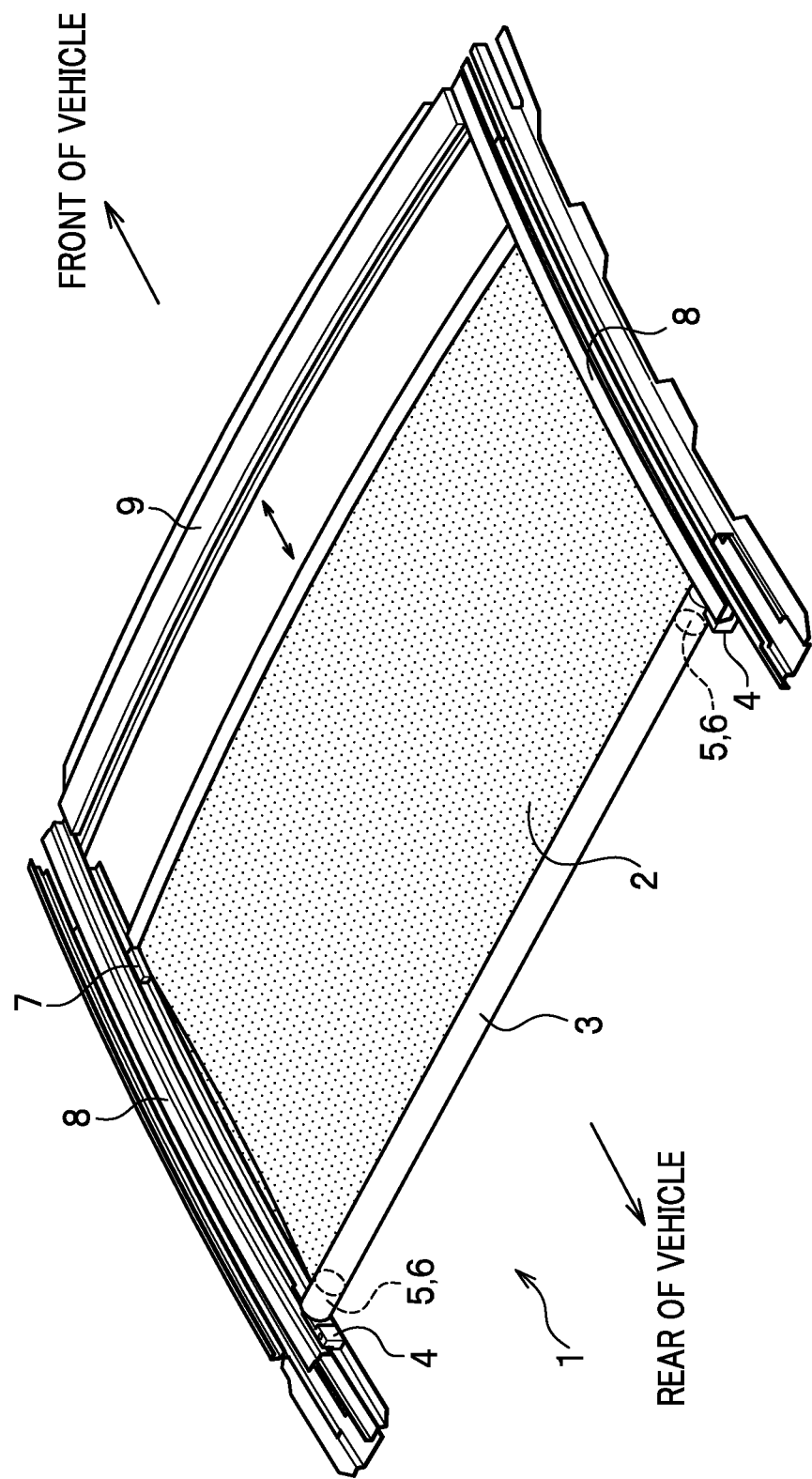

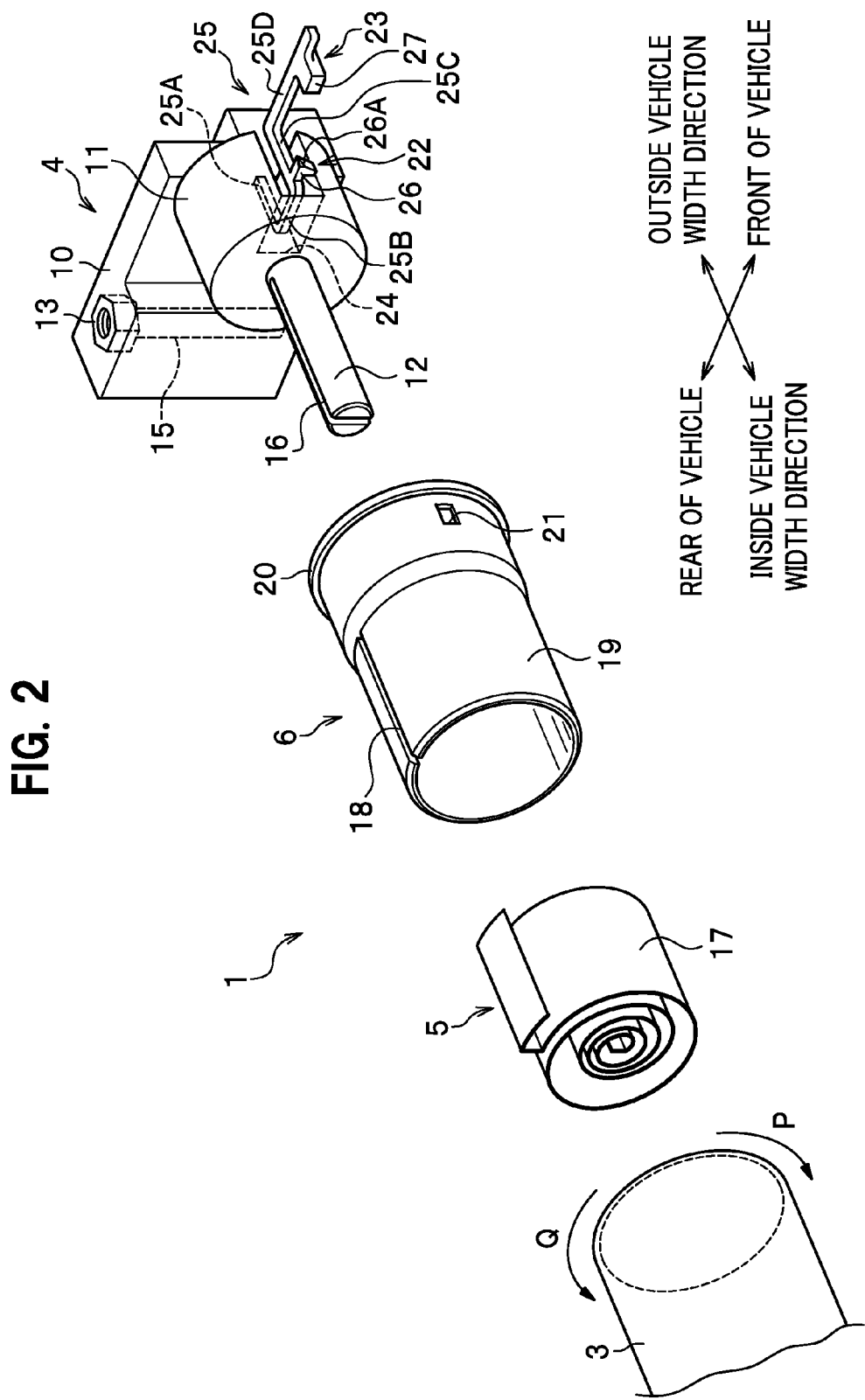

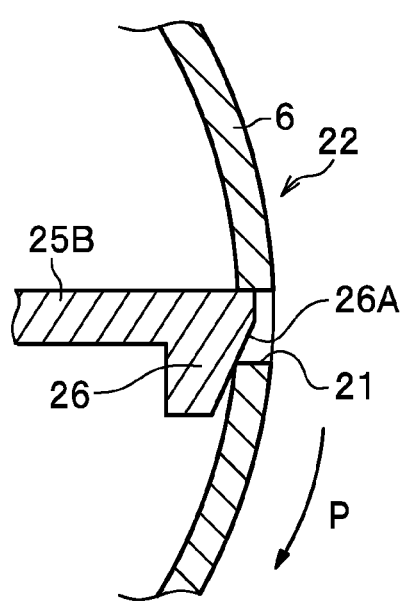
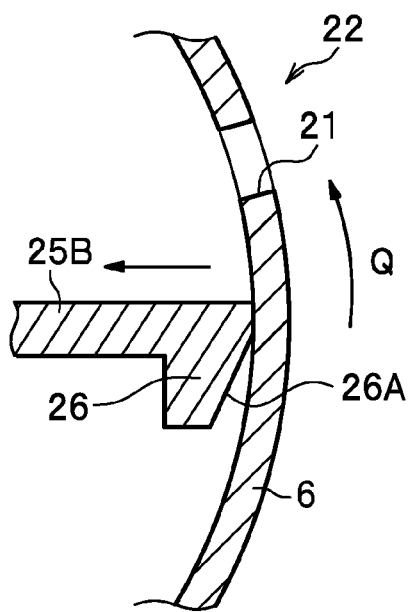
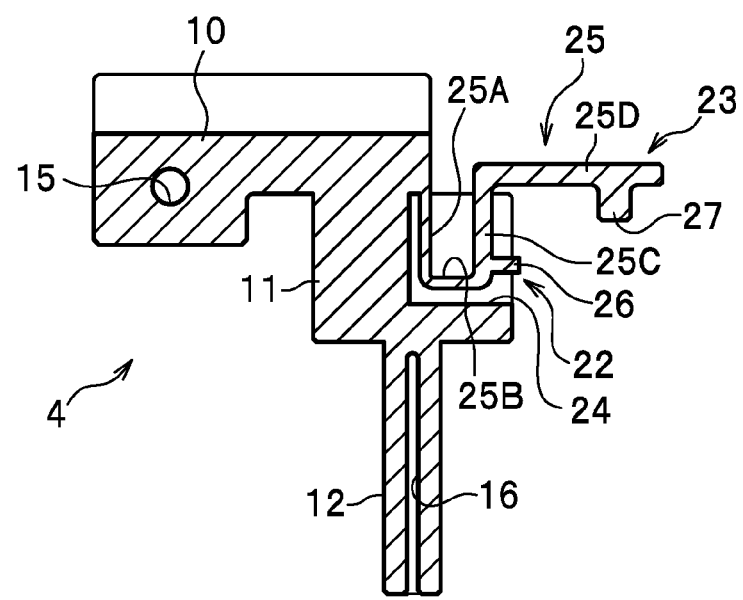

VEHICLE ROLL SHADE DEVICE

TECHNICAL FIELD

The present invention relates to a vehicle roll shade device.

BACKGROUND ART

A vehicle roll shade device is known which includes a shade for opening and closing an inner opening of a roof, a roll shaft for winding up the shade in a roll shape, bearing members for pivotally supporting the roll shaft, and elastic members interposed between the roll shaft and the bearing members (for example, Japanese Patent Application Publication No. 2001-180280). The elastic members are arranged to apply tension to an expanded shade for preventing the shade from sagging.

Such a kind of roll shade device often has a structure in which an elastic restoring force is applied to the elastic members at the time of assembling operation for the roll shade device. For example, a worker rotates the roll shaft about the bearing members in a shade feeding direction, which is so-called a pre-winding, to give an elastic restoring force to the elastic members so that the roll shaft rotates in a shade rewinding direction. Then, the roll shade device is assembled while the pre-winding state is kept. Accordingly, after assembling, the shade is always applied with tension so as to be rewound on the roll shaft.

Note that, in general, sliding shoes are installed on both sides at a front end of the shade. The sliding shoes are guided in guide rails. In a case where the shade is operated manually, for example, a frictional force acting between the sliding shoes and the guide rails is set to be larger than the elastic restoring force of the elastic members, to allow the shade to be kept at any opening/closing position. On the other hand, in a case where the shade is operated automatically, for example, as described in Japanese Patent Application Publication No. 2001-180280, the sliding shoes are connected to a driving cable, to allow the shade to be kept at any opening/closing position.

SUMMARY OF THE INVENTION

Problems to be Solved by the Invention

The assembling operation to assemble a roll shade device while the above described pre-winding state is kept is time-consuming. In the assembling operation for the roll shade device, the bearing members are assembled at predetermined assembling positions while the sliding shoes are fitted in the guide rails to expand the shade. In this case, since the bearing members are arranged on both ends of the roll shaft, the assembling operation is extremely time-consuming, in which the bearing members on both ends are assembled at predetermined assembling positions while rotation of the roll shaft in the shade rewinding direction is held by hand against the elastic restoring force of the elastic members. Other way of assembling operation method may possible in which a pin tool is inserted between the bearing member and the roll shaft to hold rotation of the roll shaft for assembling the bearing member and the pin member is removed after the assembling. However, in this case, the pin member needs to be inserted and removed, which is time-consuming, and a problem may occur that the worker forgets to remove the pin tool.

The present invention is invented to solve such problems, and intends to provide a vehicle roll shade device which facilitates assembling operation.

Means to Solve the Problems

To solve the above problems, the present invention provides a vehicle roll shade device having: a shade which opens and closes an inner opening of a roof; a roll shaft which winds the shade in a roll shape; a bearing member which pivotally supports the roll shaft; and an elastic member which is interposed between the roll shaft and the bearing member, wherein the bearing member includes: a lock mechanism which locks rotation of the roll shaft in a state of being urged to rotate in a shade rewinding direction by the elastic member; and a release mechanism which releases a locked state of the lock mechanism, and wherein a portion of the release mechanism comes in contact with a predetermined portion to be displaced when the bearing member is assembled to an assembling position, and the locked state of the lock mechanism is released in conjunction with the displacement.

The lock mechanism arranged in the bearing member allows the roll shaft to be kept in a pre-wound state without using a hand or a pin tool etc., improving assembly workability. Further, the release mechanism is arranged in the bearing member and the portion of the release mechanism comes in contact with the predetermined portion to be displaced when the bearing member is assembled to the assembling position, and the locked state of the lock mechanism is released in conjunction with the displacement, to eliminate removing a pin tool or the like, and a problem that a worker forgets to remove the pin tool never occurs, resulting in improving assembly workability.

Still further, in the present invention, the lock mechanism includes an engaging portion which engages with an engaged portion of the roll shaft, and the release mechanism includes: a switch portion which comes in contact with the predetermined portion; and a flexible portion having the switch portion, wherein the engaging portion of the lock mechanism is formed on the flexible portion of the release mechanism.

According to the present invention, the engagement of the engaging portion is released by means of the bent of flexible portion, which is an element of the release mechanism, to allow the lock mechanism and the release mechanism to be realized easily in a simple structure.

As the lock mechanism, a ratchet mechanism may be adapted by which the engaging portion passes the engaged portion when the roll shaft rotates in a shade feeding direction, and the engaging portion engages with the engaged portion only when the roll shaft rotates in a shade rewinding direction.

Advantageous Effects of the Invention

The present invention can improve workability of assembling a roll shaft while keeping a pre-wound state.

BRIEF DESCRIPTION OF THE DRAWINGS

FIG. 1 is an external perspective view of a roll shade device;

FIG. 2 is an exploded perspective view of the roll shade device;

FIGS. 3A and 3B are illustrations of a lock mechanism, where FIG. 3A shows a state in which rotation in a shade rewinding direction is locked and FIG. 3B shows a state in which rotation in a shade feeding direction is allowed, respectively;

FIG. 4 is a planar cross-sectional view of a bearing member;

FIG. 6A shows a state in which rotation of the roll shaft is locked and FIG. 6B shows a state in which the rotation is released, respectively.

DETAILED DESCRIPTION OF THE INVENTION

Figure 5:
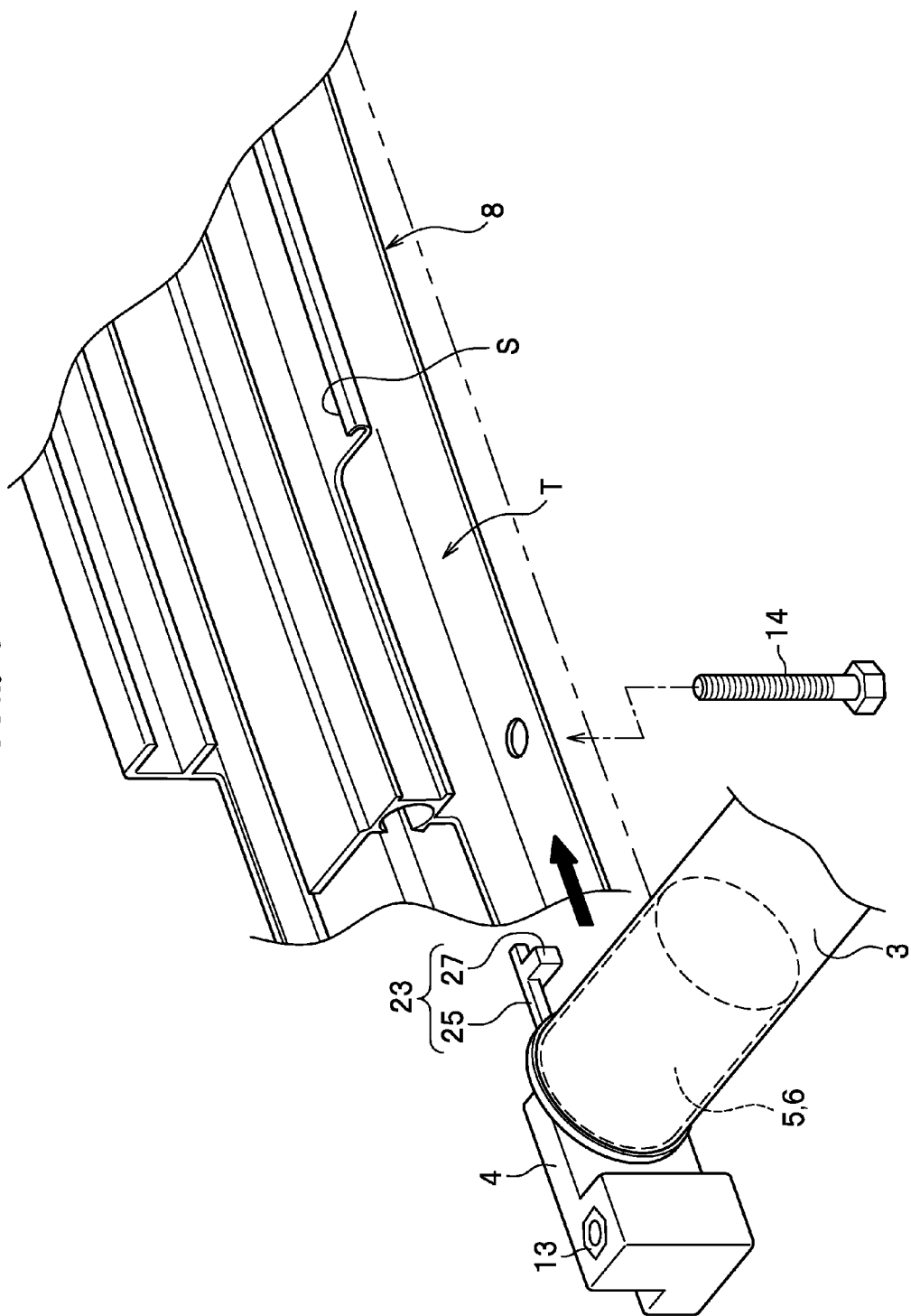
FIG. 5 is an external perspective view around an assembling position of the roll shade device.

FIG. 1 shows a roll shade device 1 which takes in and shades light through a roof of a vehicle (not shown), especially, an inner opening (not shown) formed in a ceiling of a vehicle compartment, and includes a shade 2 which opens and closes the inner opening, a roll shaft 3 which winds the shade 2 in a roll shape, bearing members 4 which pivotally support the roll shaft 3, elastic members 5 which are interposed between the roll shaft 3 and the bearing members 4, and adapters 6.

Though a structure of the shade 2 itself is not especially limited, the shade 2 has, in general, a basic layer structure including a base material layer sandwiched between surface material layers. The shade 2 is formed as a thin fabric which is flexible to an extent to be wound on the roll shaft 3 even if the shade 2 has a multi-layer structure as described above. A surface material may be a synthetic fabric, a natural fabric, a leather or the like, and a base material may be a fibrous material, a synthetic resin material, a mixture thereof or the like. Sliding shoes 7 are installed on both sides at a front end of the shade 2.

The roll shaft 3 is a cylindrical member of which both ends are open, and is rotatably arranged in the rear of the inner opening having its axis direction in a vehicle width direction. A rear end of the shade 2 is fixed to a circumferential face of the roll shaft 3.

On both sides of the inner opening, guide frames 8 are arranged which extend in a vehicle longitudinal direction and are fixed to a body frame (not shown). The guide frames 8 are members for guiding the sliding shoes 7 and sliding shoes of a roof panel of a sunroof device (not shown), and are formed, for example, from an extruded section of an aluminum alloy. Front ends of the right and left guide frames 8 are connected by a front frame 9.

As shown in FIG. 2, the bearing member 4 includes a main body 10, a bearing portion 11 in a cylindrical shape protruding from the main body 10 at a position closer to a front portion of the vehicle and having its axial direction in the vehicle width direction, and a spring support portion 12 extending from a center on an end face of the bearing portion 11 in the vehicle width direction. The bearing member 4 is formed, for example, of a synthetic resin material, and all portions constituting a lock mechanism 22 and a release mechanism 23 to be described later are formed by integral molding. In an upper part in the main body 10 closer to a rear portion of the vehicle, a nut 13 is installed, for example, by insert molding, and a through hole 15 is formed through which a bolt 14 (FIG. 5) for assembling is inserted from a lower face of the main body 10 to the nut 13. The spring support portion 12 is in a cylindrical shape, and a slit 16 is formed from its end toward an end face of the bearing portion 11.

The elastic member 5 in the embodiment is a member which is interposed between a roll shaft 3 as a rotor and the bearing member 4 as a stator, and is formed from a spiral spring 17. An inner end of the spiral spring 17 is held in the slit 16 of the spring support portion 12, and an outer end thereof is held in a slit 18 of an adapter 6. The adapter 6 is a member on a rotor side which integrally rotates with the roll shaft 3, and includes: a body portion 19 in a cylindrical shape which is inserted into an end opening of the roll shaft 3 and is pivotally supported on the bearing portion 11 of the bearing member 4 rotatably; a flange portion 20 which is formed at one end of the body portion 19 and abuts on an opening edge of the roll shaft 3; the slit 18 formed in the body portion 19; and an engagement opening 21 in a rectangular shape which is formed in a circumferential face of the body portion 19. The adapter 6 is fixed in the roll shaft 3 by press fitting or other fixing method to integrally rotate with the roll shaft 3.

<Lock Mechanism 22, Release Mechanism 23>

In FIGS. 2 and 3, the bearing member 4 includes the lock mechanism 22 for locking rotation of the roll shaft 3 in a state of being urged to rotate in a shade rewinding direction P by the spiral spring 17, and the release mechanism 23 for releasing a locked state of the lock mechanism 22.

A hollow portion 24 is formed in a circumferential face, closer to the front portion of the vehicle, of the bearing portion 11 of the bearing member 4. In FIG. 4, on a side face of the main body 10 closer to the front portion of the vehicle, a flexible portion 25 in a thin rod shape having a rectangular cross section is protruded toward the hollow portion 24. The flexible portion 25 is formed to include a first side portion 25A which extends from the side face of the main body 10 inward in the vehicle width direction, a second side portion 25B which extends from an end of the first side portion 25A frontward in a vehicle length direction, a third side portion 25C which extends from a front end of the second side portion 25B outward in the vehicle width direction, and a fourth side portion 25D which extends from an end of the third side portion 25C frontward in the vehicle length direction. The first side portion 25A, the second side portion 25B, and a portion of the third side portion 25C closer to the vehicle compartment in the vehicle width direction are positioned in the space of the hollow portion 24, and are positioned inside the roll shaft 3 once the roll shaft 3 is assembled. A remaining portion of the third side portion 25C and the fourth side portion 25D are positioned outside the roll shaft 3.

In FIGS. 3A and 3B, the lock mechanism 22 includes an engaging portion 26 which engages with an engaged portion (engaged opening 21) on the roll shaft 3. The engaging portion 26 is formed as a claw-like protrusion which protrudes from an end of the third side portion 25C of the flexible portion 25 closer to the vehicle compartment in the vehicle width direction. The lock mechanism 22 is made of a ratchet mechanism by which the engaging portion 26 passes the engaged opening 21 when the roll shaft 3 rotates in the shade feeding direction Q, and the engaging portion 26 engages with the engaged opening 21 only when the roll shaft 3 rotates in the rewinding direction P. The engaging portion 26 includes an inclined face 26A.

As shown in FIGS. 2 and 4, the release mechanism 23 is configured to include a switch portion 27 which comes in contact with a predetermined portion S (FIG. 5), and the flexible portion 25 having the switch portion 27. The switch portion 27 is a protruding body which protrudes toward the vehicle compartment in the vehicle width direction from the fourth side portion 25D of the flexible portion 25.

<Operation>

In FIG. 2, a worker assembles the bearing member 4, the spiral spring 17 and the adapter 6 in a predetermined assembling procedure to each end of the roll shaft 3. The roll shaft 3 is pivotally supported by the bearing portion 11 of the bearing member 4 via the adapter 6 rotatably. The spiral spring 17 is interposed between the roll shaft 3 and the bearing member 4.

Then, the sliding shoe 7 is fitted into the guide frame 8, and in a state that the shade 2 has been fully expanded, the roll shaft 3 is rotated by the predetermined number of rotations in the shade feeding direction Q about the bearing member 4 to pre-wind the spiral spring 17. The "predetermined number of rotations" is such an extent that, after assembling, the spiral spring 17 has an elastic restoring force such that the roll shaft 3 is always urged to rotate in the shade rewinding direction P regardless of opening and closing positions of the shade 2. During the pre-winding operation, the roll shaft 3 can rotate for pre-winding in the shade feeding direction Q by the ratchet mechanism, that is, by bending the flexible portion 25 for the inclined face 26A of the engaging portion 26 to pass the engaged opening 21. When the pre-winding is stopped after the predetermined number of rotations, the engaging portion 26 engages with the engaged opening 21. Thus, the roll shaft 3 is locked so as not to rotate in the shade rewinding direction P, while keeping a state of being urged to rotate in the shade rewinding direction P by the pre-wound spiral spring 17.

Figure 6A:
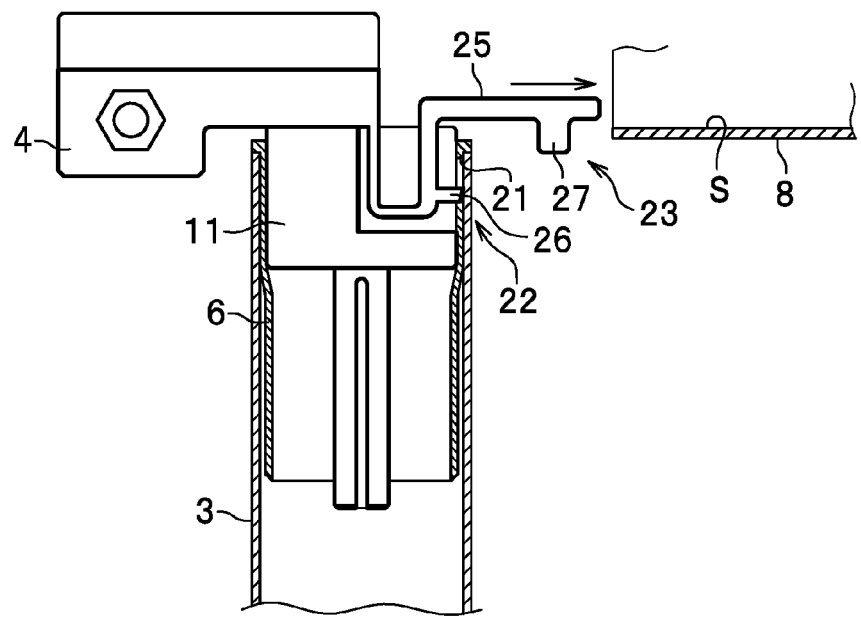
FIG. 6A and FIG. 6B are plan views of the lock mechanism and a release mechanism, where
Figure 6B:
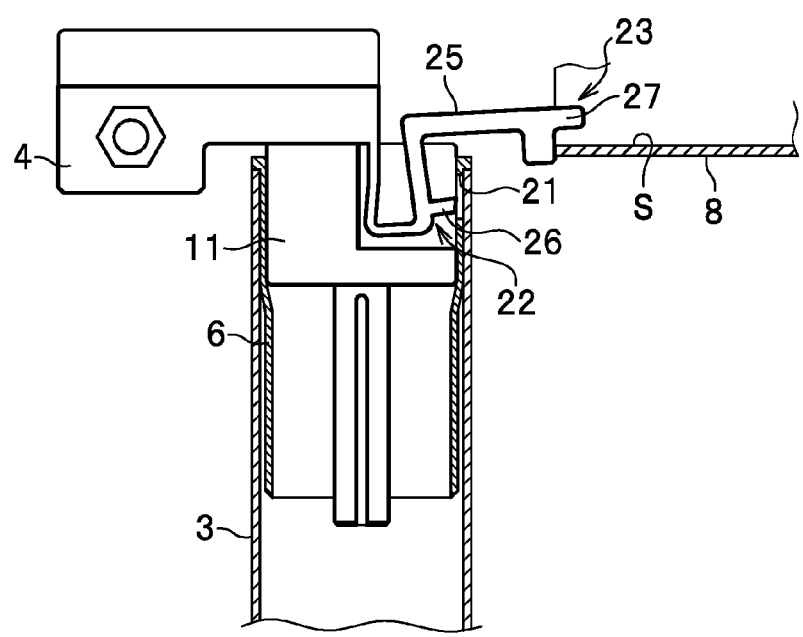

Next, as shown in FIG. 5, the bearing member 4 is assembled at an assembling position T on the guide frame 8. FIG. 6A shows a state before assembling the bearing member 4 and FIG. 6B shows a state after assembling the bearing member 4, respectively. Once the bearing member 4 is assembled, as shown in FIG. 6B, the switch portion 27 comes in contact with the predetermined portion S, and the flexible portion 25 is bent due to elastic deformation so that the switch portion 27 is displaced outward in the vehicle width direction. The predetermined portion S is, for example, a part of the guide frame 8 as shown in FIG. 5. With the bent of the flexible portion 25, the engaging portion 26 is also displaced in a radially inward direction of the roll shaft 3 to come off the engaged openings 21, allowing the roll shaft 3 to rotate in the shade rewinding direction P. In other words, once the switch portion 27 of the release mechanism 23 comes in contact with the predetermined portion S to be displaced, the locked state of the lock mechanism 22 is released in mechanically conjunction with the displacement. Then, the bearing member 4 is fixed on the guide frame 8 with the bolt 14 as shown in FIG. 5, and assembling for the roll shade device 1 is completed.

In a case where the shade 2 is operated manually, a frictional force acting between the sliding shoe 7 and the guide frame 8 as shown in FIG. 1 is set, for example, to be larger than the elastic restoring force of the spiral spring 17, allowing the shade 2 to remain at any opening and closing positions. In contrast, in a case where the shade 2 is operated automatically, for example, the sliding shoe 7 is connected to a driving cable, allowing the shade 2 to remain at any opening and closing positions. The expanded shade 2 is always applied with a tension by urging the roll shaft 3 to rotate in the shade rewinding direction P, preventing the shade 2 from sagging. Note that the engaging portion 26 never engages with the engaged opening 21 unless the roll shade device is disassembled for parts replacement or maintenance, etc. hereinafter.

As described above, the lock mechanism 22 is arranged in the bearing member 4 to facilitate keeping the roll shaft 3 in the pre-wound state without using a hand, a pin tool or the like, improving assembly workability. The roll shade 1 has a structure in which the release mechanism 23 is arranged in the bearing member 4 and a portion (switch portion 27) of the release mechanism 23 comes in contact with the predetermined portion S to be displaced when the bearing member 4 is assembled to the assembling position T, and the locked state of the lock mechanism 22 is released in conjunction with the displacement, allowing the locked state of the lock mechanism 22 to be released naturally when the bearing member 4 is assembled. Therefore, a removal operation of a pin tool etc. is not necessary, and a problem in which the worker forgets to remove the pin tool never occurs, resulting in improving assembly workability.

Further, the lock mechanism 22 includes the engaging portion 26 which engages with the engaged portion (engaged opening 21) on the roll shaft 3, and the release mechanism 23 includes the switch portion 27 which comes in contact with the predetermined portion S and the flexible portion 25 having the switch portion 27, wherein the engaging portion 26 is formed in the flexible portion 25, to allow the engagement of the engaging portion 26 to be released by the bent of the flexible portion 25 as an element of the release mechanism 23 for realizing the lock mechanism 22 and the release mechanism 23 in a simple structure.

The preferred embodiment of the present invention has been described above. The embodiment described above uses the adapters 6 to form the engaged openings 21 therein, and to hold the outer ends of the spiral springs 17 thereto. However, without using the adapters 6, the engaged openings 21 may be formed in the roll shaft 3 and the outer ends of the spiral springs 17 may be held on the roll shaft 3.

Further, the elastic members 5 are not limited to the spiral springs 17, and may be, for example, torsion coil springs or the like.

Still further, the predetermined portions S are also not limited to the guide frames 8, and may be, for example, members of other structure elements attached to the guide frames 8, as long as they are positioned around the assembling positions T.

The invention claimed is:

1. A vehicle roll shade device comprising:
   a shade that opens and closes an inner opening of a roof;
   a roll shaft that winds the shade in a roll shape;
   a bearing member that pivotally supports the roll shaft; and
   an elastic member that is interposed between the roll shaft and the bearing member,
   wherein the bearing member includes:
   a lock mechanism that locks rotation of the roll shaft in a state of being urged to rotate in a shade rewinding direction by the elastic member; and
   a release mechanism that releases a locked state of the lock mechanism, and
   wherein a portion of the release mechanism comes in contact with a predetermined portion to be displaced when the bearing member is assembled to an assembling position, and the locked state of the lock mechanism is released in conjunction with the displacement.

2. The vehicle roll shade device according to claim 1,
   wherein the lock mechanism includes an engaging portion that engages with an engaged portion of the roll shaft; and
   the release mechanism includes: a switch portion that comes in contact with the predetermined portion; and a flexible portion having the switch portion, and wherein the engaging portion of the lock mechanism is formed on the flexible portion of the release mechanism.

3. The vehicle roll shade device according to claim 2, wherein the lock mechanism is made of a ratchet mechanism by which the engaging portion passes the engaged portion when the roll shaft rotates in a shade feeding direction, and the engaging portion engages with the engaged portion only when the roll shaft rotates in a shade rewinding direction.

* * * * *